United States Patent [19]

Goldner et al.

[11] Patent Number: 4,968,536
[45] Date of Patent: Nov. 6, 1990

[54] PROCESS FOR THE PRODUCTION OF A CHIP RESISTANT COATING AND/OR A FILLER LAYER

[76] Inventors: Wolfgang Goldner, Bayernstrasse 15, D-5628 Heiligenhaus; Klaus P. Doebler, An der Hoffnung 19, D-5608 Radevormald, both of Fed. Rep. of Germany

[21] Appl. No.: 314,457

[22] Filed: Feb. 23, 1989

[30] Foreign Application Priority Data

Feb. 24, 1988 [DE] Fed. Rep. of Germany ....... 3805629

[51] Int. Cl.$^5$ .............................................. B05D 3/02
[52] U.S. Cl. .................................. 427/388.4; 427/409; 524/507; 524/512; 524/539
[58] Field of Search ................ 427/388.1, 388.4, 407.1, 427/409; 524/507, 512, 539

[56] References Cited

U.S. PATENT DOCUMENTS 4,463,038  7/1984  Takeuchi et al. ................ 427/409 X
4,820,555  4/1989  Kuwajima et al. ............. 427/409 X Primary Examiner—Michael Lisignan
Attorney, Agent, or Firm—Neuman, Williams, Anderson & Olson

[57] ABSTRACT

An ecologically acceptable process is provided for the production of a chip resistant coating finishes by application of a chip resistant intermediate coating layer said coating comprising an aqueous based composition containing from 30 to 60% by weight carboxyl-containing polyesters or (meth)acrylates and copolymers thereof with vinyl compounds having an average acid value of 30 to 100 mg KOH/g and an average OH value of 50 to 250 mg KOH/g, neutralized with nitrogen bases, 5 to 25% by weight of a water-soluble or water-dispersible, blocked isocyanate prepolymer, 15 to 30% by weight water and @0 to 50% by weight pigments, fillers and/or auxililaries and additives, wet-in-wet overcoating with an aqueous filler, common stoving and painting with an aqueous based finishing paint.

The chip resistant coatings are aqueous (water) based and essentially free of ecologically contaminating volatile organic solvents.

11 Claims, 1 Drawing Sheet

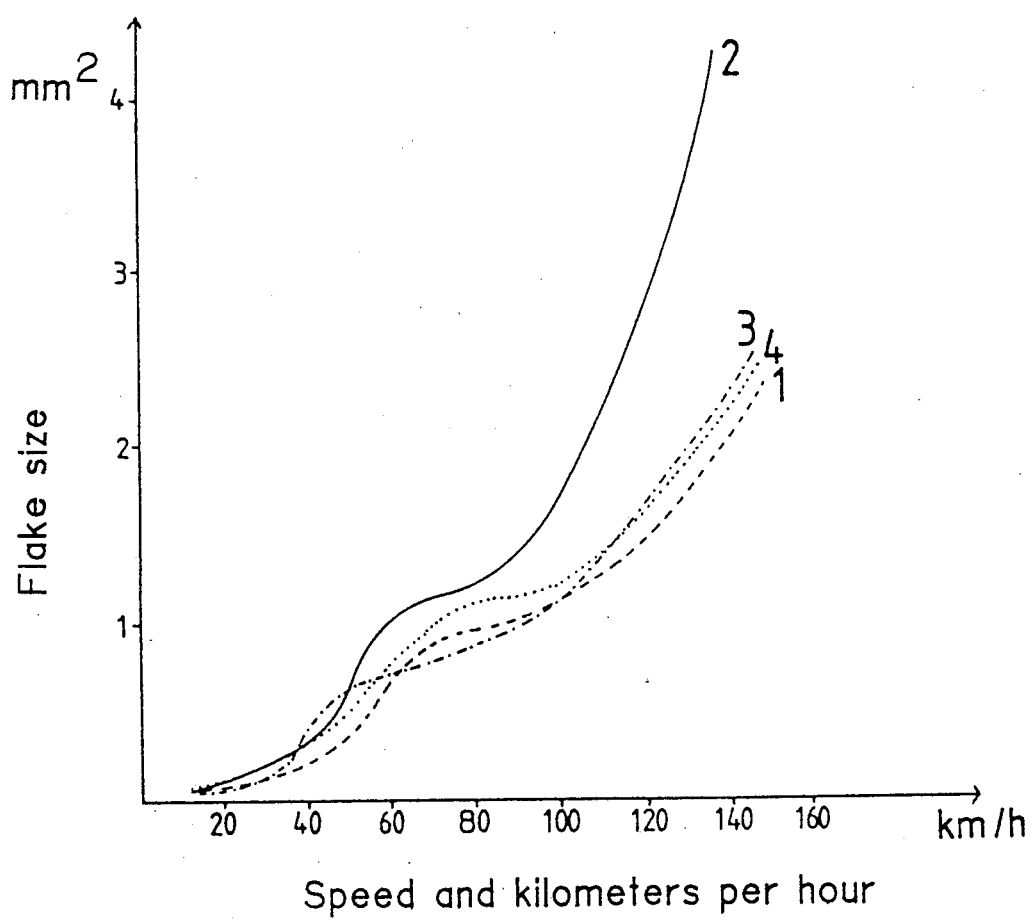

PROCESS FOR THE PRODUCTION OF A CHIP RESISTANT COATING AND/OR A FILLER LAYER

BACKGROUND OF THE INVENTION

Field Of The Invention

This invention relates to a ecologically improved, essentially solvent free process for the production of a chip resistant finishes on an optionally primed substrate by application and stoving of an aqueous based chip resistant coating composition, an aqueous based filler, an aqueous based finishing paint and, optionally, a clear lacquer. The process according to the invention enables the production chip resistant finishes particularly in the automotive field.

The production of chip resistant intermediate coatings has long been of considerable interest, particularly in the automotive field. Hitherto, chip resistant coatings have been produced on the basis of solvent-containing primers. Thus, DE-OS 33 37 394 corresponding to U.S. Pat. No. 4,606,947 describes a chip resistant protective paint based on polyesters with blocked isocyanates which contains standard paint solvents.

Although it is known that water-dilutable coatings, such as primers and fillers, can be produced, no water-dilutable coating composition suitable for the production of so called non-chip or chip resistant intermediate films has hitherto been produced. Thus, it is standard practice for example to produce water-dilutable primers from water-dilutable resins, such as polyesters, polyacrylates, and/or corresponding dispersions and/or emulsions containing suitable crosslinking agents, preferably water-dilutable aminoplastics. Aqueous dispersions or emulsions based on polyesters, polyethers and polyacrylates and crosslinking agents containing masked reactive isocyanate groups are described, for example, in DE-A-35 45 618 and in EP-A-0 140 323. Dispersions such as these are used, for example, as base paints for two-layer coatings. Binder systems based on epoxy dispersions containing water-dispersible, blocked isocyanates are also basically known (GB-A 2,127,829).

In recent years, solvent-containing systems have been vigorously criticized because of the ecological problems they cause on account of their solvent content. However, the aqueous systems hitherto used are also attended by serious disadvantages. Thus, it is known that one of the main difficulties in the formulation of aqueous, isocyanate-containing paint systems lies in their inadequate shelf life. Conventional water-dilutable stoving filler systems generally have mechanical disadvantages compared with solvent-containing systems in regard to chip resistance and elasticity and, accordingly, were not used for so called non-chip coatings. Lacquer systems based on aqueous polyurethane dispersions also have the disadvantage of rapid film formation which makes them unsuitable for application by electrostatic film forming systems, such as for example high-rotation bells. Tools are in danger of solvent contamination. Neither are the known aqueous primer systems suitable for wet-in-wet application with the known solvent-containing chip resistant intermediate coatings, because losses of surface quality are inevitable.

In view of the increasing demand for modern, i.e. ecologically safe, paint systems and the increasing legislative pressure for a reduction in the emission of organic volatile constituents in paint systems, for example automotive assembly-line paint systems, there is a continuing need for water-dilutable lacquer systems. In the field of chip resistant primers, this has given rise to the problem of providing an aqueous binder system which satisfies the high quality requirements of known solvent-containing binder systems, but does not have any of the disadvantages of hitherto known aqueous binder systems and combines high mechanical strength with problem-free application in electrostatic paint plants, for example high-rotation bells.

SUMMARY OF THE INVENTION

The present invention is comprised of an ecologically improved essentially solvent free process for providing clip resistant finishes on a substrate surface which comprises applying to an optionally primed substrate surface an aqueous based chip resistant coating composition over-coated with an aqueous based filler composition in a wet-on-wet application, stoving the wet-on-wet applied coatings to cure the same; applying an aqueous based finish paint to the aforesaid coatings cured and drying the same.

More particularly, the present invention comprises an ecologically improved essentially solvent free process for providing chip resistant finishes on a substrate surface by applying to an optionally primed substrate surface an intermediate aqueous based chip resistant coating in conjunction with conventional water based filler and finishing paint coatings, wherein said aqueous based chip resistant coating composition comprises:

(A) from about 30 to 60% by weight of one or more carboxyl-containing polyesters or (meth)acrylates and copolymers thereof with vinyl compounds which, or of which the mixtures, have an average acid value of from about 30 to 100 mg KOH/g and an average OH value of from about 50 to 250 mg KOH/g and have been made soluble in water by neutralization with nitrogen bases, (B) from about 5 to 25% by weight of a watersoluble or water-dispersible, blocked isocyanate prepolymer of which 1 to 80% by weight and preferably from about 3 to 10% by weight may be replaced by a watersoluble amine resin, (C) from about 15 to 30% by weight water, and (D) from about 10 to 50% by weight pigments and/or fillers and/or standard paint auxiliaries and additives. Component A is preferably present in the coating according to the invention in a quantity of from about 35 to 45% by weight. Component B is preferably present in the coating used in accordance with the invention in a quantity of from about 12 to 17% by weight. The water, component C, is preferably present in a quantity of from about 20 to 25% by weight.

Component D is preferably present in the coating used in accordance with the invention in a quantity of from 20 to 25% by weight.

Accordingly, the present invention relates to the use of the coating composition described above for the production of chip resistant protective coatings and/or filler layers, particularly in the painting of motor vehicles.

The chip resistant coating composition layer used in accordance with the invention may be applied to the optionally primed substrate and may optionally be over-coated with an aqueous filler by wet-in-wet application, after which the two coatings applied wet-in-wet may be stoved together without intermediate drying. The surface thus coated may then be painted with a finishing paint and, optionally, a clear lacquer.

BRIEF DESCRIPTION OF THE DRAWING

The attached drawing is a graph showing chip flake size (vertical axis) produced in a simulated flying stone test with the simulated speed in kilometers per hour, (horizontal axis) for various coating systems (1 through 4).

DESCRIPTION OF THE PREFERRED EMBODIMENTS AND SPECIFIC EXAMPLES

The coating composition used in accordance with the invention comprises a binder component A based on polyesters and/or (meth)acrylates or copolymers of (meth)-acrylates with vinyl compounds. It is essential that these components contain carboxyl groups and have an average acid value of from about 30 to 100 mg KOH/g and an average OH value of from about 50 to 250 mg KOH/g. Where the components in question are present in admixture, the mixture has the same acid and values.

The carboxyl-containing component used in accordance with the invention may be a polyester or poly(meth)acrylate or poly(meth)acrylate copolymer. The products in question are resins having a structure of the type typically encountered in the paint field, although the requirements stated above in respect of the average acid and OH values have to be satisfied. Resins such as these preferably have a molecular weight of from about 2000 to 5000. They may be made soluble in water by neutralization with bases, particularly nitrogen bases.

Examples of polyesters are those based on linear di-alcohols containing from 2 to 8 carbon atoms and/or branched polyalcohols containing from 3 to 10 carbon atoms, such as for example butane-1,4-diol, neopentyl glycol, tri-propylene glycol, glycerol, ethylene glycol, hexane-1,6-diol and pentaerythritol and mixtures thereof. The carboxylic acid component may be an aliphatic, cycloaliphatic or aromatic dicarboxylic or polycarboxylic acid (for example a tricarboxylic acid). Examples of such acids are sebacic acid, adipic acid, maleic acid, hexahydrophthalic acid, phthalic acid, isomers thereof, such as isophthalic acid and terephthalic acid, trimellitic acid and mixtures thereof.

Suitable polyacrylates and polymethacrylates are, for example, mono- and copolymers consisting of the following individual components:

$\alpha,\beta$-unsaturated monocarboxylic acids, such as acrylic acid, methacrylic acid $\alpha,\beta$-unsaturated dicarboxylic acids or semiesters thereof, such as maleic acid or fumaric acid or mono-ethyl esters thereof $\alpha,\beta$-unsaturated hydroxyalkyl (meth)acrylates containing at least one primary and/or secondary hydroxy group, such as hydroxyethyl (meth)acrylate, hydroxypropyl (meth)acrylate, butane-1,4-diol monoacrylate, 2,3-dihydroxypropyl (meth)acrylate vinyl monomers with no other reactive groups, such as styrene, vinyl toluene, o-methyl styrene and also the methyl, isopropyl, butyl, cyclohexyl and benzyl esters of (meth)acrylic acid To increase the hydroxyl group content, the COOH-containing copolymers may be reacted with alkylene oxides, such as ethylene oxide, propylene oxide, butylene oxide.

For example, it is possible to use the acrylic polymers or acrylic copolymers described in DE-A-32 13 160.

The binder component A may also be a mixture of polyesters and/or poly(meth)acrylates or copolymers thereof. A mixture such as this may be made up in such a way that the individual components have different carboxyl and/or hydroxyl values and the mixture has the acid and OH values specified above. A mixture of this type may be partly condensed. Examples of such mixtures, which may be used in accordance with the invention, are described in AT-PS 328 587, according to which the binder component A consists of a water-insoluble, film-forming polyhydroxyl compound (polyester and/or poly(meth)acrylate or copolymer) having an acid value below 10 mg KOH/g and a hydroxyl value of 50 to 650 mg KOH/g and a film-forming polycarboxyl compound (polyester and/or poly(meth)acrylate or copolymer) having an acid value of 30 to 280 mg KOH/g in a molar ratio of carboxyl groups to hydroxyl groups of from 1:1 to 1:25, preferably from 1:2 to 1:25 and more preferably from 1:3 to 1:10; this mixture may be partly condensed.

In the preferred embodiment described above, the polyhydroxyl compound may readily be prepared in the usual way by condensation of polyols in excess, such as monoethylene glycol, diethylene glycol, triethylene glycol, glycerol, trimethyolopropane, pentaerythritol, with di- or polycarbocylic acids or anhydrides thereof, such as phthalic acid, terephthalic acid, trimellitic acid, succinic acid, adipic acid, sebacic acid, proportionally using monocarboxylic acids containing from 5 to 20 carbon atoms in corresponding proportions. They may also be prepared by copolymerization of (meth)acrylates containing free hydroxyl groups, such as ethylene glycol monomethacrylates, with other copolymerizable vinyl compounds, such as acrylic or methacrylic acid esters of monohydric alcohols, amides of acrylic or methacrylic acid, styrene, vinyl toluene and other monomers, providing they contain no carboxyl groups.

The film-forming polycarboxyl compound present in the mixture or partly condensed mixture has an acid value of from 30 to 280 mg KOH/g and may be obtained, for example, by reaction of hydroxyl-rich pre-condensates with di- or tricarboxylic anhydrides, for example by reaction of hydroxyl-rich polyesters with phthalic anhydride or trimellitic anhydride. The adducts of dieneophilic compounds, for example maleic anhydride, with unsaturated compounds having molecular weights above 500 are preferred. These include the esters of natural unsaturated fatty acids and resinic acids with polyalcohols, for example glycerol, pentaerythritol, or compounds containing epoxide groups, such as bisphenol A glycidyl ethers. Copolymers of acrylic acid or methacrylic acid with other $\alpha,\beta$-ethylenically unsaturated monomers, such as (meth)acrylates, styrene, vinyl toluene, are also suitable.

The isocyanates (component B) used to crosslink the binder used in accordance with the invention may be aliphatic, cycloaliphatic or aromatic isocyanates. Trimeric hexamethylene diisocyanate (biuret or isocyanate form) and 3-isocyanatomethyl-3,5,5-trimethyl cyclohexyl isocyanate (isophorone diisocyanate) have proved to be particularly suitable. The substances suitable as locking agents for the production of masked isocyanates are described, for example, in Houben-Weyl, Vol. 14/2, Part 2, 4th Edition, 1963, pages 61 to 70. Lactams (for example e-caprolactam), -diketones, such as acetoacetic ester or acetyl acetone, are preferred. Oximes, such as butanone oxime, are particularly preferred. These classes of compounds may also be selected with the different deblocking temperatures (different desired stoving temperatures) in mind.

The coating compositions used in accordance with the invention may be prepared in the usual way, for example by the preparation of a pigment paste already containing around 50 to 60% by weight of the binder (component A), subsequent addition of more binder and hardener (component B) and dilution with water (for example fully deionized water) to the desired application viscosity. The application viscosity, as determined in accordance with DIN (German Industry Norm) 53 211 (4 mm cup), is preferably between 18 and 40 s and more preferably between 23 and 30 s.

However, the coating compositions may also be prepared by other methods, for example the binder component A and the hardener component B may be mixed. Part of the resulting mixture is processed with the pigment paste, after which the rest of the mixture of component A and B is added and the whole is diluted with water to the required level.

The coating composition used in accordance with the invention is preferably prepared in such a way that the ratio of the OH/NCO equivalents of binder component A/hardener component B is from 1:0.5 to 1:1.5. The ratio by weight of component D (pigment, fillers, etc.) to the binder component A is preferably from 0.5:1 to 2:1.

The coating composition used in accordance with the invention has the advantage that the binder component A is dilutable or soluble in water. This solubility is obtained by neutralization with a base. Suitable bases are typical nitrogen bases such as, for example, ammonia, aliphatic amines or aliphatic alkanolamines, for example diethylamine, triethylamine, N,N-dimethyl ethanolamine and diethanolamine. By virtue of the composition of the coating compositions used in accordance with the invention, there is no need to use additives having an emulsifying or resin-stabilizing effect.

The coating compositions used in accordance with the invention may contain pigments and/or fillers and-/or auxiliaries and additives typically used in paints as component D. Examples of pigments are titanium dioxide, carbon black, talcum and barium sulfate.

The coating compositions used in accordance with the invention are particularly suitable for the production of non-chip protective coatings, particularly as non-chip intermediate layers. To this end, the coating compositions may be applied by knife coating, dip coating, spray coating, such as compressed-air and airless spraying, and by electrostatic coating, for example using a high-rotation bell. As intermediate layers, the coating compositions may be applied for example in layer thicknesses of 8 to 30 $\mu$m. If the non-chip protective coating is applied as a separate primer, it may be applied in a layer thickness of for example from 20 to 80 $\mu$m.

One advantage of the coating compositions used in accordance with the invention is that an aqueous filler layer may be applied by the wet-in-wet method without intermediate drying. Fillers suitable for wet-in-wet application are typical water-based filler materials, including those based on alkyl/melamine resins.

The wet-in-wet application may be carried out without intermediate drying. It has been found that, in contrast to the conventional wet-in-wet application of aqueous/solvent-containing systems, this does not adversely affect surface quality. Where a filler is used for overcoating, the overall layer thickness may be selected in such a way that the desired overall filler layer thickness (for example from 30 to 40 m) is obtained. Common application provides for considerably better non-chip properties of the coating as a whole than application of the filler alone.

The protective non-chip layer and the protective filler layer are stoved together. The drying conditions of the non-chip protective layer, optionally together with the filler layer, are determined by the nature of the masking agent selected for component B. In general, the temperatures are in the range from 120 to 200° C., the temperature preferably remaining constant for 10 to 30 minutes. The preferred stoving conditions are a stoving temperature of about 155° to 170° C. and a stoving time of about 20 minutes.

The coating compositions used in accordance with the invention may thus be used, for example, in the painting of motor vehicles, for example between commercial electro-deposition paints and water-dilutable fillers. They may be directly applied to the metal substrate or to the metal substrate pre-primed with typical primers. The non-chip protective layer obtained, optionally overcoated with a filler layer, may be painted with typical finishing paints after stoving.

Accordingly, the coating compositions used in accordance with the invention afford various advantages over the conventional use of solvent-containing non-chip protective coatings. The coating layers applied may be overcoated with an aqueous filler by the wet-in-wet method. Even in thin layers, they afford excellent protection against chipping. Defect-free surfaces are obtained with no crater formation, no boiling blisters and no unwanted structures.

The coating compositions adhere excellently to metal substrates and to typical electrodeposition paints. Their adhesion to aqueous fillers and typical finishing paint systems is also excellent.

The invention is illustrated by the following Examples.

EXAMPLE 1

34.30 g of a commercially available saturated, oil-free polyester, consisting essentially of terephthalic acid, isophthalic acid, ethylene glycol and hexane-1,6-diol (75% in butyl diglycol) and having an acid value of approximately 35 mg KOH/g and an OH value of approximately 50 mg KOH/g is homogenized first with 7.3 g butanoneoxime or caprolactam-masked isocyanate of the hexamethylene diisocyanate type (80% in butyl glycol, latent NCO content: 10.7%), 1.2 g N,N,-dimethyl ethanolamine and 57.2 g fully deionized water, if necessary with addition of commercially available foam-inhibiting additives. The shear stressing in a laboratory stirrer (disc stirrer) should be equivalent to about 30 minutes at 5000 to 6000 r.p.m.

22.00 g of this mixture (31.6%) are then dispersed for 40 minutes at 40° to 50° C. in a bead mill with 0.05 g carbon black, 1.75 g talcum, 11.80 g BaSO$_4$, 9.90 g TiO$_2$ and 3.30 g fully deionized water and the paste obtained is completed with 51.20 g of the binder mixture and, if necessary, with commercially available additives having a substrate-wetting effect. The paste is diluted with more fully deionized water for application by spraying. The solids content reached is approximately 45%. The binder mixture remains homogeneous for more than 3 months.

EXAMPLE 2

The resin used in Example 1 is replaced by a likewise commercially available saturated, oil-free polyester of phthalic anhydride, pentaerythritol, trimethylolpropane and glycerol (55% in fully deionized water/butanol) having an acid value of approximately 45 mg KOH/g and an OH value of approximately 95 to 100 mg KOH/g, Mn>3000.

As in Example 1, this resin is first processed to a binder system and then to a pigmented lacquer system, again by the method described in Example 1. An application viscosity equivalent to a solids content of 46% is reached.

The binder system remains homogeneous for more than 3 months.

EXAMPLE 3

30.0 g of a fatty-acid-containing resin prepared in accordance with AT-PS 328 587 (U.S. Pat. No. 3,960,789) (40% in water/organic solvents, 14:1) having an average acid value of from 35 to 45 mg KOH/g and an OH value of from 180 to @90 mg KOH/g, are ground in a bead mill for 40 minutes at 40° to 50° C. with 26.6 g of the filler mixture described in Example 1 and 5.7 g fully deionized water, optionally with addition of 0.5 g of a commercially available foam inhibitor.

The paste is then completed with 11.3 g of the same resin, 8.5 g of the isocyanate described in Example 1, 0.4 g tertiary amine and 17.0 g fully deionized water. A sprayable paint having a solids content of 49% may be obtained by the addition of about another 4.0 g fully deionized water. To improve wetting of the substrate, corresponding additives may be incorporated in the final paint.

EXAMPLE 4

Aqueous filler:

34.6 g of a fatty-acid-containing resin prepared in accordance with AT-PS 328 587 (U.S. Pat. No. 3,960,789) (40% in water/organic solvents) having an average acid value of 35 to 45 mg KOH/g and an OH value of approximately 100 to 115 mg KOH/g are dispersed for 40 minutes at 40° to 50° C. with 0.1 g carbon black, 2.1 g talcum, 13.7 g BaSO., 11.9 g TiOz, 6.2 g fully deionized water and 1.0 g of a commercially available foam inhibitor (PMI, a product of the Drais company).

The paste is then completed with 21.2 g of the same resin, 5.6 g of a commercially available 98% melamine resin, 0.2 g of a wetting agent and 1.9 g fully deionized water. The lacquer is diluted to application viscosity with fully deionized water.

Systems tested:

1. (Standard): Primer: conventional electrodeposition primer paint for automotive assembly-line painting. Filler: conventional alkyd-melamine filler based on organic solvents. Finishing paint: alkyd/melamine assembly-line finishing paint, white.

2. Primer and finishing paint as standard, aqueous filler as in Example 4; no non-chip intermediate coat.

3. Primer and finishing paint as indicated standard system; aqueous chip resistant protective intermediate coat as in Example 3 above and aqueous filler applied by the wet-in-wet method in a total dry layer thickness of 35 to 40 μm.

4. Primer and finishing paint as in standard system, aqueous chip resistant protective intermediate coat of Example 3 above as filler.

| Stoving temperatures | |
| --- | --- |
| CP | 30 mins. 180° C. (CP = cathodic electro-deposition paint) |
| Filler and NCIC | 20 mins. 160° C. (NCIC = non-chip protective intermediate coat) |
| Finishing paint | 30 mins. 130° C. |

| Technological Comparison Tests | | | | | |
| --- | --- | --- | --- | --- | --- |
| System | EP* (mm) | CH** (2 mm) DIN 53151 | EP-layer (μm) | Finishing paint layer (μm) | Filler layer (μm) | Konig pendulum hardness(s) |
| 1 | 5.6 | 0–1 | 20 | 39 | 34 | 129 |
| 2 | 4.5 | 1 | 21 | 42 | 36 | 83 |
| 3 | 6.0 | 0–1 | 21 | 42 | 35 | 86 |
| 4 | 6.4 | 0–1 | 20 | 43 | 34 | 72 |

*EP is Erichsen Test
**CH is lattice cut test (a conventional paint lifting test by German Industry Norm. DN 53131)

The results of the paint chip test are shown in the graph of accompanying drawing. The tests were carried out with the flying stone simulator according to "Farbe und Lack", 8/1984, pages 646–653. The graph lines show the flake size (in mm$^2$; the speed profile was recorded between 20 and 150 km/h using particles in the shape of 120° truncated cones, weight 0.5 g, each which are shot at the painted surface at an angle of 60° at 21° C.).

We claim:

1. An ecologically improved essentially solvent free process for providing chip resistant finishes on a substrate surface which comprises applying to an optionally primed substrate surface an aqueous based chip resistant coating composition over-coated with an aqueous based filler composition in a wet-on-wet application, stoving the wet-on-wet applied coatings to cure the same; applying a finish paint to the aforesaid coatings cured and drying the same.

2. An ecologically improved essentially solvent free process for providing chip resistant finishes on a substrate surface which comprises applying to an optionally primed substrate surface an aqueous based chip resistant coating composition over-coated with an aqueous based filler composition in a wet-on-wet application, stoving the wet-on-wet applied coatings to cure the same; applying a finish paint to the aforesaid coatings cured and drying the same, wherein the aqueous based chip resistant coating composition comprises:

(A) from about 30 to 60% by weight of one or more carboxyl-containing polyesters or (meth)acrylates and copolymers thereof with vinyl compounds which, or of which the mixtures, have an average acid value of from about 30 to 100 mg KOH/g and an average OH value of from about 50 to 250 mg KOH/g and have been made soluble in water by neutralization with nitrogen bases, (B) from about 5 to 25% by weight of a water-soluble or water-dispersible, blocked isocyanate prepolymer of which from about 1 to 80% by weight may be replaced by a water-soluble amine resin, (C) from about 15 to 30% by weight water, and (D) from about 10 to 50% by weight pigments and/or fillers and/or standard paint auxiliaries and additives.

3. A process according to claim 2, wherein the carboxyl-containing component A is a mixture, which may partly be a condensate, of a water-insoluble, film-forming polyhydroxyl component having an acid value of below about 10 mg KOH/g and a hydroxyl value of from about 50 to 650 mg KOH/g and a film-forming polycarboxyl component having an acid value of from about 30 to 280 mg KOH/g in a molar ratio of carboxyl groups to hydroxyl groups of from 1:1 to 1:25 and preferably from 1:3 to 1:10.

4. An ecologically improved essentially solvent free process for providing chip resistant finishes on a substrate surface by applying to an optionally primed substrate surface an intermediate aqueous based chip resistant coating in conjunction with conventional water based filler and finishing paint coatings, wherein said aqueous based chip resistant coating composition comprises:
- (A) from about 30 to 60% by weight of one or more carboxyl-containing polyesters or (meth)acrylates and copolymers thereof with vinyl compounds which, or of which the mixtures, have an average acid value of from about 30 to 100 mg KOH/g and an average OH value of from about 50 to 250 mg KOH/g and have been made soluble in water by neutralization with nitrogen bases,
- (B) from about 5 to 25% by weight of a water-soluble or water-dispersible, blocked isocyanate prepolymer of which from about 1 to 80% by weight may be replaced by a water-soluble amine resin,
- (C) from about 15 to 30% by weight water, and
- (D) from about 10 to 50% by weight pigments and/or fillers and/or standard paint auxiliaries and additives, said process comprising the steps of:
- i. applying said aqueous based chip resistant coating to a substrate surface;
- ii. overcoating said wet chip resistant coating with an aqueous based filler in a wet-on-wet application;
- iii. stoving the wet-on-wet chip resistant and filler coatings together to cure the same;
- iv. overcoating the cured coatings with a finishing paint and drying the same.

5. A process according to claim 4, wherein the carboxyl-containing component A is a mixture, which may partly be a condensate, of a water-insoluble, film-forming polyhydroxyl component having an acid value of below 10 mg KOH/g and a hydroxyl value of from 50 to 650 mg KOH/g and a film-forming polycarboxyl component having an acid value of from 30 to 280 mg KOH/g in a molar ratio of carboxyl groups to hydroxyl groups of from 1:1 to 1:25 and preferably from 1:3 to 1:10.

6. A process according to claim 1 wherein an aqueous based primer is applied to the substrate surface and dried prior to applying the aqueous based filler, chip resistant and finishing coats.

7. A process according to claim 1 wherein an aqueous based clear finish lacquer is applied to the dried coated surface resulting from the process of claim 1.

8. A process according to claim 4 wherein the substrate is metal.

9. A process according to claim 4 wherein the substrate is a primed metal surface.

10. A process according to claim 4 wherein the dried coating of the process is overlaid with an aqueous based clear lacquer coating.

11. The process of claim 2, wherein said carboxyl-containing polyesters or (meth)acrylates and copolymers thereof with vinyl compounds have a molecular weight of from 2000 to 5000.

* * * * *